(12) United States Patent
Debesis et al.

(10) Patent No.: US 6,487,913 B2
(45) Date of Patent: Dec. 3, 2002

(54) STRAIN GAUGE WITH RESONANT LIGHT MODULATOR

(75) Inventors: John R. Debesis, Penfield; Edward P. Furlani, Lancaster; Marek W. Kowarz, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/739,858

(22) Filed: Dec. 18, 2000

(65) Prior Publication Data

US 2002/0104381 A1 Aug. 8, 2002

(51) Int. Cl.[7] .............................................. G01L 1/24
(52) U.S. Cl. ...................................................... 73/800
(58) Field of Search ...................... 73/800, 779, 775, 73/801, 862.324, 862.624

(56) References Cited

U.S. PATENT DOCUMENTS

| | | | |
|---|---|---|---|
| 4,432,239 A | * 2/1984 | Bykov | ........................ 73/800 |
| 4,492,435 A | 1/1985 | Banton et al. | |
| 4,596,992 A | 6/1986 | Hornbeck | |
| 4,901,586 A | 2/1990 | Blake et al. | |
| 5,090,254 A | 2/1992 | Guckel et al. | |
| 5,166,742 A | * 11/1992 | Kobayashi et al. | ........ 356/35.5 |
| 5,275,055 A | 1/1994 | Zook et al. | |
| 5,311,360 A | 5/1994 | Bloom et al. | |
| 5,417,115 A | 5/1995 | Burns | |
| 5,550,516 A | 8/1996 | Burns et al. | |
| 5,559,358 A | * 9/1996 | Burns et al. | ................. 257/431 |
| 5,661,593 A | 8/1997 | Engle | |
| 5,757,536 A | 5/1998 | Ricco et al. | |
| 6,038,057 A | 3/2000 | Brazas, Jr. et al. | |
| 6,061,166 A | 5/2000 | Furlani et al. | |

\* cited by examiner

*Primary Examiner*—Max Noori
(74) *Attorney, Agent, or Firm*—Stephen H. Shaw (57) ABSTRACT

A strain gauge for measuring strain in a structural member, including: a light modulator adapted to be attached to the structural member, further including: a plurality of deformable elements, each of said deformable elements having a reflective surface and a resonant frequency that varies as a function of strain on the element; means for exerting a force to the deformable elements to cause them to deform at their resonant frequency between first and second operating states, an optical system for directing incident light onto the light modulator, and directing modulated light from the light modulator to a sensor that provides an output signal that varies as a function of the resonate frequency of said deformable elements; and means for generating a representation of the strain in the structural member from said output signal.

2 Claims, 6 Drawing Sheets

STRAIN GAUGE WITH RESONANT LIGHT MODULATOR

FIELD OF THE INVENTION

This invention relates to measuring instruments. More particularly, the invention relates to an instrument for measuring strain in structural members, incorporating a resonant light modulator, that is particularly suitable for a wide range of environmental conditions, including both cryogenic and high temperatures.

BACKGROUND OF THE INVENTION

Advances in micromachining technology have given rise to a variety of micro-electromechanical systems (MEMS) including micromachined light modulators for low cost display applications. Such light modulators provide high-resolution, high operating speeds (KHz frame rates), multiple gray scale levels, color adaptability, high contrast ratio, and compatibility with VLSI technology. Representative examples of these light modulators are disclosed in U.S. Pat. Nos. 4,492,435 issued Jan. 8, 1985 to Banton et al. entitled Multiple Array Full Width Electromechanical Modulator, U.S. Pat. No. 4,596,992 issued Jun. 24, 1986 to Hornbeck entitled Linear Spatial Mechanical Light Modulator and Printer, U.S. Pat. No. 5,311,360 issued May 10, 1994 to Bloom et al entitled Method And Apparatus For Modulating a Light Beam; U.S. Pat. No. 5,661,593 issued Aug. 26, 1997 to Engle entitled Linear Electrostatic Modulator, U.S. Pat. No. 5,757,536 issued May 26, 1998 to Ricco et al. entitled Electrically-Programmable Diffraction Grating; U.S. Pat. No. 6,038,057 issued Mar. 14, 2000 to Brazas, Jr. et al. entitled Method and System for Actuating Electro-mechanical Ribbon Elements in Accordance to a Data Stream; and U.S. Pat. No. 6,061,166 issued May 9, 2000 to Furlani et al. entitled Diffractive Light Modulator. Micro-machined diffractive light modulators are of particular interest and versatility for strain gauge applications.

Other MEMS devices have been used to sense various physical properties such as acceleration, pressure, mass flow, temperature, humidity, air density or weight. Representative devices are disclosed in U.S. Pat. No. 5,090,254 issued Feb. 25, 1992 to Guckel et al. entitled Polysilicon Resonating Beam Transducers; U.S. Pat. No. 5,275,055 issued Jan. 4, 1994 to Zook et al. entitled Resonant Gauge With Microbeam Driven In Constant Electric Field; U.S. Pat. No. 5,417,115 issued May 23, 1995 to Burns entitled Dielectrically Isolated Resonant Microsensors; and U.S. Pat. No. 5,550,516 issued Aug. 27, 1996 to Burns et al. entitled Integrated Resonant Microbeam Sensor and Transistor Oscillator. The sensors disclosed in these patents are said to operate on the principal that the natural frequency of vibration (i.e. resonate frequency of an oscillating beam or other member) is a function of the strain induced in the member. More particularly, tensile forces tending to elongate the member increase its resonate frequency, while forces tending to compress the member reduce its resonate frequency. The dual vibrating beam transducers disclosed in U.S. Pat. No. 4,901,586 issued Feb. 20, 1990 to Blake et al. entitled Electrostatically Driven Dual Vibrating Beam Force Transducer, are said to operate in an apparently similar manner. All of the above mentioned transducers and sensors use integrated electrical means to sense the motion of the moving member. This limits the design and placement of both the sensors and the associated electronics. There is a need therefore for an improved strain gauge.

SUMMARY OF THE INVENTION

The present invention provides a strain gauge for measuring strain in a structural member, including: a light modulator adapted to be attached to the structural member, further including: a plurality of deformable elements, each of said deformable elements having a reflective surface and a resonant frequency that varies as a function of strain on the element; means for exerting a force to the deformable elements to cause them to deform at their resonant frequency between first and second operating states; an optical system for directing incident light onto the light modulator, and directing modulated light from the light modulator to a sensor that provides an output signal that varies as a function of the resonate frequency of said deformable elements; and means for generating a representation of the strain in the structural member from said output signal.

One advantage of the strain gauge of the invention is that the strain of a structural member can be sensed at locations remote from the structural member. Another advantage is the sensitivity of the strain gauge due to the size of its features. Specifically, the strain gauge features are on the order of microns, and it can measure changes in length on the order of nanometers. Other features and advantages of this invention will be apparent from the following detailed description.

DETAILED DESCRIPTION OF THE INVENTION

The strain gauge comprises a light modulator fixedly attached to the structural member for modulating an incident beam of light by diffraction; at least one source of light; an optical system for directing light onto the light modulator;

and a sensor that receives light reflected from the light modulator and produces an output signal. The light modulator includes deformable elements, having light reflective surfaces and a resonant frequency that varies with strain on the elements, suspended at both ends above a substrate that also has a reflective surface. A drive circuit applies a lateral force to the deformable elements causing them to deform at their resonant frequency between first and second operating states. The sensor output signal varies as a function of the resonant frequency of the deformable elements. Output circuitry responsive to the sensor output signal extracts a frequency dependent signal which represents the strain in the deformable elements and in the structural member, that produced the variation in the resonant frequency of the deformable elements. And an output device responsive to the extracted frequency dependent signal produces a representation of the strain in the structural member.

Figure 1:
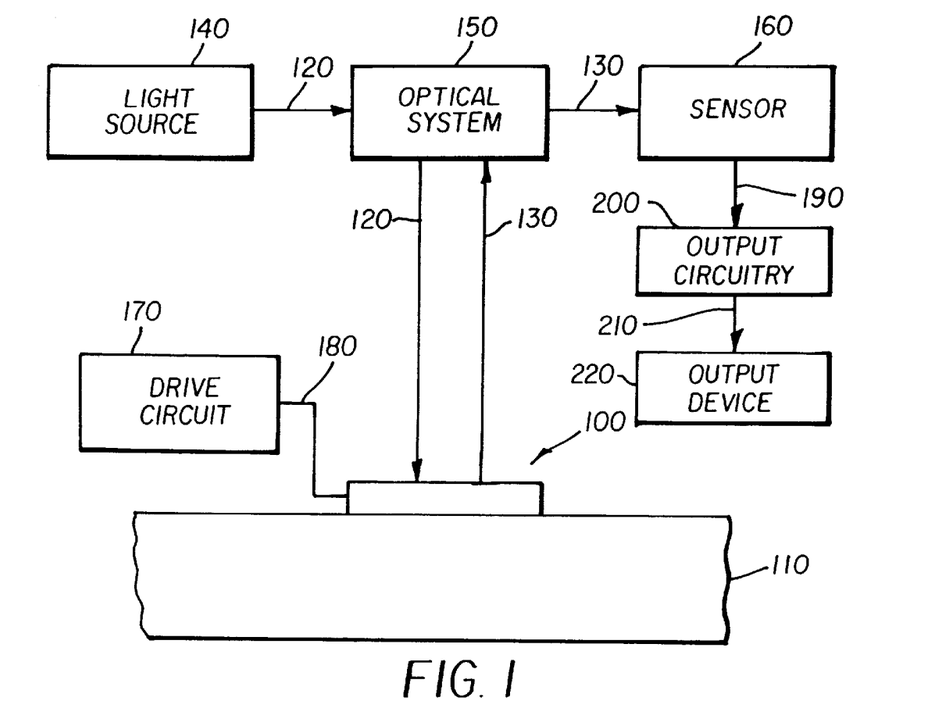
FIG. 1 is a schematic of a strain gauge with a resonant light modulator in accordance with the invention.
Figure 2:
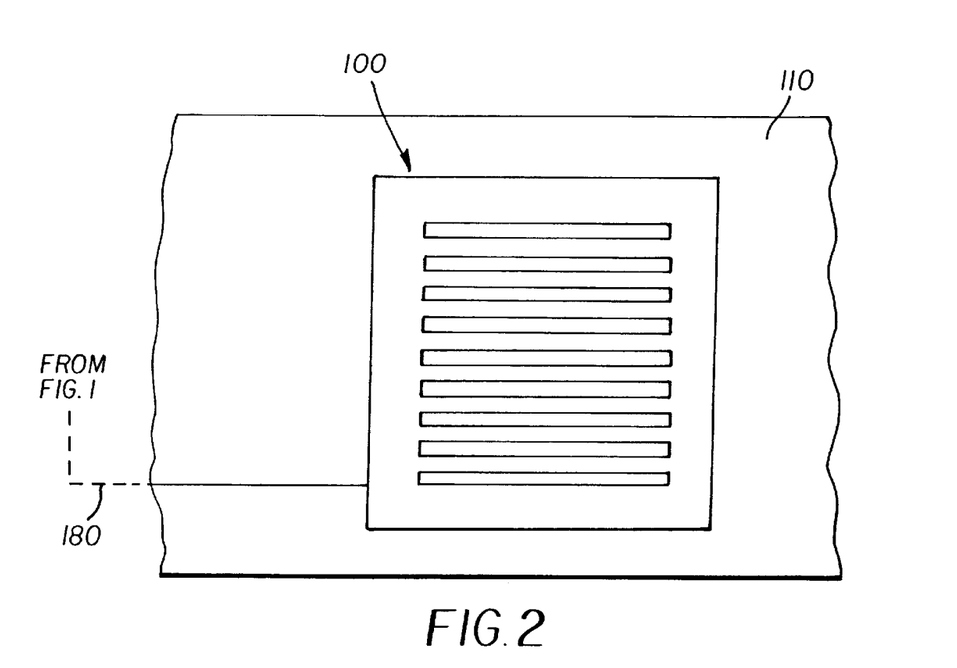
FIG. 2 is a partial top view of the light modulator attached to a structural member.

The preferred embodiment includes a light source that provides light of a wavelength $\lambda$, one or more light sensors, a light modulator having a variable resonant frequency, an optical system for directing and focusing light from the light source onto the light modulator and directing the modulated light to the light sensor(s), output circuitry responsive to the output signal produced by the sensor for extracting a frequency dependent signal which represents the strain in the structural member that caused a variation in the resonant frequency, and an output device responsive to the extracted frequency dependent signal for producing a representation of the strain in the structural member. The light modulator is designed to modulate incident light having a wavelength $\lambda$. It includes a plurality of deformable elements, having reflective surfaces and a variable resonant frequency supported at both ends over a substrate that also has a light reflective surface; and means for applying a force to the deformable elements to cause the deformable elements to deform between first and second operating states FIGS. 1 and 2 provide schematic representations of the use of this invention to determine strain in a structural member 110. An optical system 150 directs light 120 from a light source 140 onto a light modulator 100, which is fixedly attached to the structural member 110, and directs modulated light 130 from the light modulator 100 to a sensor 160. The light source 140 is preferably a laser or photodiode which produces light of a wavelength $\lambda$. The sensor is preferably a photodiode. Drive circuitry 170 is connected to the light modulator 100 via circuit 180, and causes it to operate at its resonant frequency. Any strain in the structural member 110 will alter the resonant frequency of the light modulator 100, as will be described. The change in resonant frequency can be detected by sensor 160 as it monitors the modulated light 130. The sensor 160 provides a sensor output signal 190, to output circuitry 200. Output circuitry 200 extracts a frequency dependent signal, which represents the strain in the structural member that caused a variation in the resonant frequency, from sensor output signal 190. This frequency dependent signal, also referred to as output data signal 210, is stored by output device 220 for subsequent analysis, as will be described, or displayed by output device 220 as a representation of the strain in structural member 110.

Figure 3:
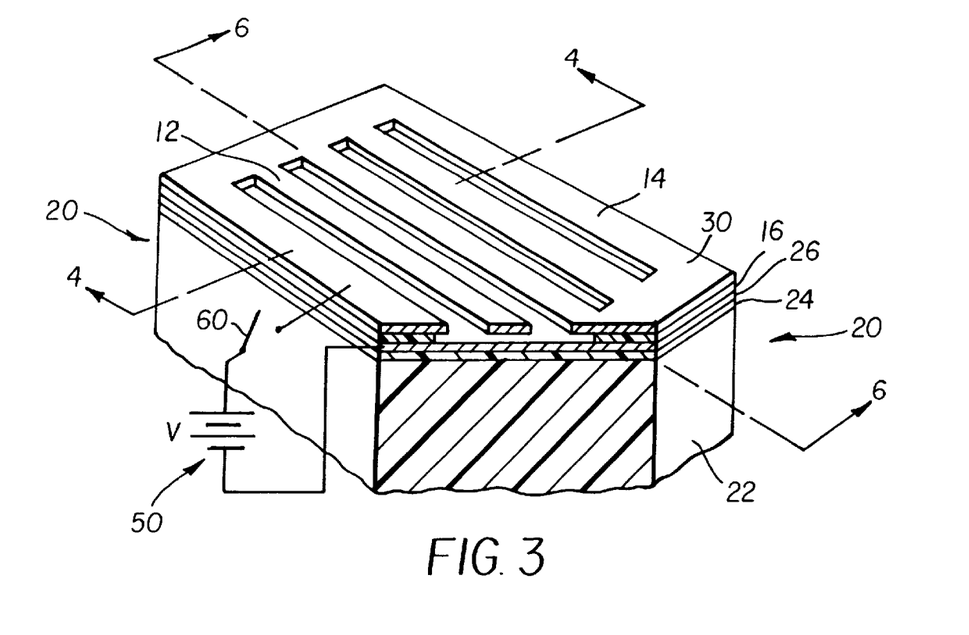
FIG. 3 is a perspective, partially cut-away view of the light modulator.
Figure 4:
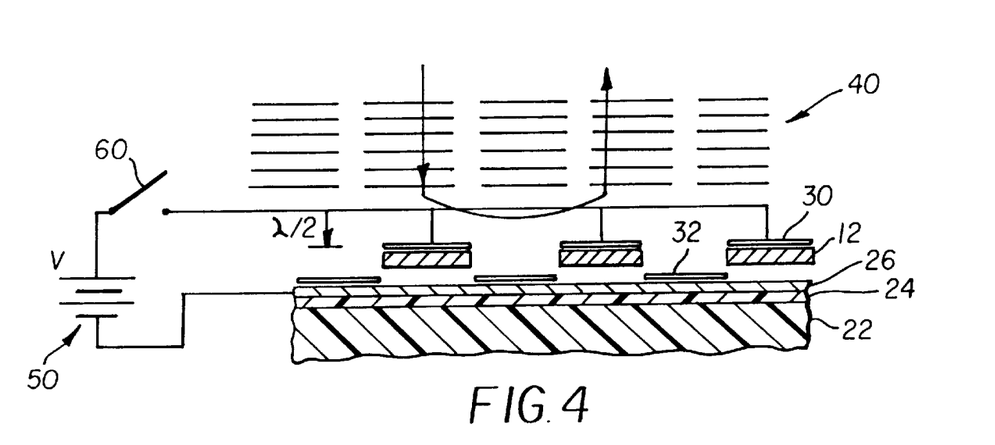
FIG. 4 is a sectional view of the light modulator of FIG. 3, taken along line 4—4 of FIG. 3, with the deformable elements in the up position.
Figure 5:
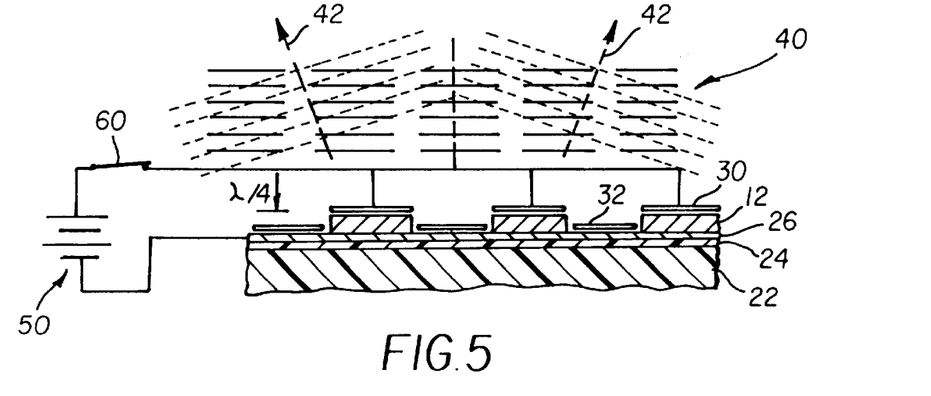
FIG. 5 is a sectional view of the light modulator of FIG. 3, also taken along line A—A of FIG. 3, with the deformable elements in the down position.
Figure 6:
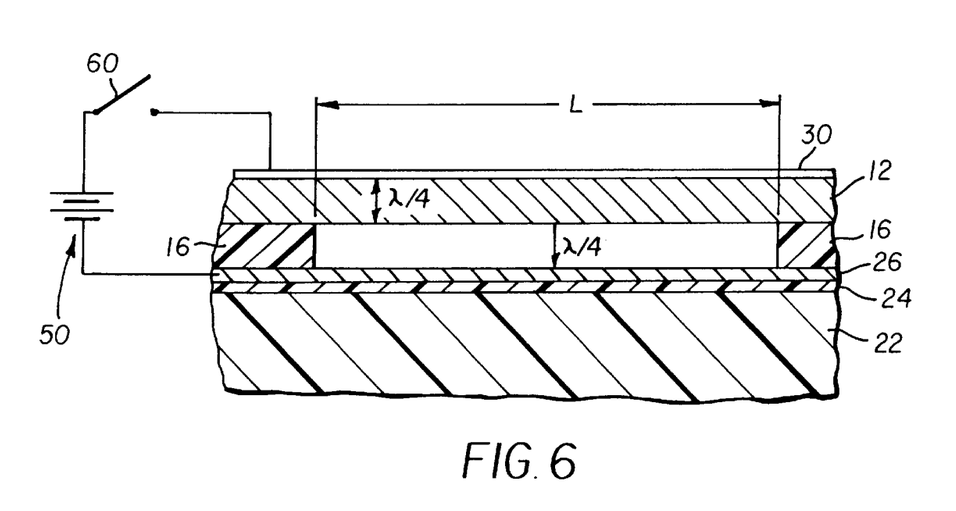
FIG. 6 is a sectional view of the light modulator of FIG. 3, taken along line 6—6 of that figure, with the deformable elements in the up position.
Figure 7:
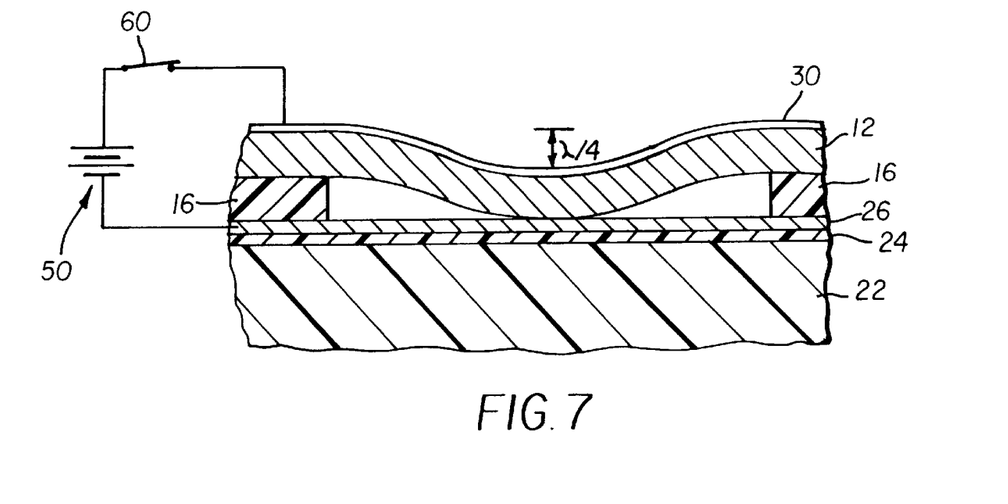
FIG. 7 is another sectional view of the light modulator of FIG. 3 along line B—B, with the deformable elements in the down position.

FIG. 3 is a perspective, partially cut-away view of a light modulator 100 that is suitable for use in the system shown in FIGS. 1 and 2. FIGS. 4 and 5 are sectional views of light modulator 100 along lines A—A in FIG. 3; and FIGS. 6 and 7 are sectional views of this modulator along lines B—B in FIG. 3. Light modulator 100 comprises a plurality of equally spaced deformable elements 12, also referred to herein as moveable magnetic electrodes, in the form of beams which are supported at both ends and integrally formed with a frame 14. The frame 14 is fixedly attached to a spacer layer 16 which, in turn, is fixedly attached to, and supported by, a base 20. Thus, strain in the structural member 110 of FIG. 1 is transmitted through the base 20 and frame 14 to the deformable elements 12, which have a resonant frequency that varies as a function of strain on the elements.

The base 20 comprises a substrate 22, a passivating layer 24 which is formed over the substrate, and a conducting layer 26 which is formed over the passivating layer 24 as shown. A thin layer 30 of light reflective and conductive material such as aluminum is deposited on the top of the deformable elements 12 and on the frame 14 as shown. A thin layer 30 of light reflective and conductive material such as aluminum is also deposited on the base 20. A power source 50 is electrically connected via a switch 60 to the conductive layers 30 and 26, thereby permitting the application of a voltage or potential between the layers 30 and 26 when the switch 60 is closed. The light modulator 100 is designed so that the height difference between the top of the deformable elements 12 when they are inactivated (i.e., in an up position), and the base 20 is equal to $\lambda/2$, where $\lambda$ is the wavelength of the incident light. The deformable elements 12 have a thickness equal to $\lambda/4$.

In FIG. 4 the light modulator 100 is shown in a sectional view taken along line A—A in FIG. 3. Specifically, three deformable elements 12 are shown. The light modulator 100 is shown with switch 60 open so that there is no voltage applied between the conductive layer 30 on the deformable elements 12 and the conductive layer 26 on the base 20. When no voltage is applied, the deformable elements 12 are flat due to the inherent residual tensile stress therein. Thus, when a light wave 40 of wavelength $\lambda$ impinges perpendicularly to the surface of the modulator 10, the light reflected from the layer 30 on the deformable elements 12 is in phase with the light reflected from the layer 30 on the base 20, the modulator 10 reflects light as a flat mirror.

In FIG. 5 the light modulator 100 is shown in a sectional view taken along line A—A in FIG. 4. Again, three deformable elements 12 are shown. The switch 60 is closed and the power source 50 imposes a voltage V between the conductive layer 30 on the deformable elements 12 and the conductive layer 26 on the substrate 22, as shown. The applied voltage gives rise to an electrostatic force between the deformable elements 12 and the base 20, and the voltage is sufficiently high enough to bend the deformable elements 12 downward until the midportion of the deformable elements 12 deflects a distance $\lambda/4$ downward as shown. It is important to note that only a portion of the deformable elements 12 deflect in this manner because they are fixedly attached to the frame 14 (see FIG. 3) at their endpoints. The voltage sufficient to activate the deformable elements 12 in this fashion is called the switching voltage. Thus when a lightwave 40 of wavelength $\lambda$ impinges perpendicularly to the surface of the modulator 10, the light reflected from the layer 30 on the deformable elements 12 is out of phase with the light reflected from the layer 30 on the base 20 between the deformable elements 12 and the modulator 10 diffracts the incident light in directions indicated by arrows 42. Optical systems can be designed to intercept the diffracted light with output occurring only when the deformable elements 12 are activated.

Referring to FIG. 6, a sectional view is shown of the light modulator 100 taken along line B—B of FIG. 3, wherein the deformable elements 12 are in an inactivated 'up' position (i.e., the switch 60 is open and there is no voltage applied between the conductive layer 30 on the deformable elements 12 and the conducting layer 26 of the base 20. FIG. 7 is a similar sectional view as shown of the light modulator 100 taken along line B—B of FIG. 3, but with the deformable elements 12 are in an activated 'down' position, i.e., the switch 60 is closed and the power source 50 imposes a voltage V between the conductive layer 30 on the deformable elements 12 and the conductive layer 26 on the base 20. As shown in FIG. 7, this causes the central portions of the deformable elements 12 to deflect into the position shown in FIG. 5, and light is diffracted.

Figure 8:
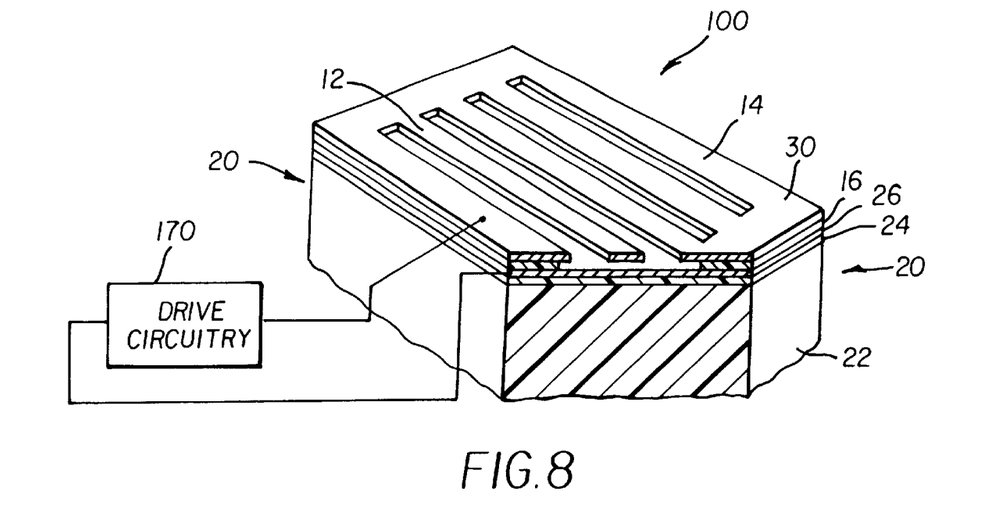
FIG. 8 is another perspective, partially cut-away view of the light modulator in FIG. 3, from the same vantage point, but with a drive circuit replacing the power source and switch in the earlier figure.

FIG. 8 is a perspective, partially cut-away view of the light modulator 100 from the same vantage point as FIG. 3, but with a drive circuit 170 instead of the power source 50 and switch 60 in FIGS. 4–7. Like the power source 50 and switch 60, drive circuit 170 supplies a voltage between the conductive layers 30 on the deformable elements and the conductive layer 26 on the base. However, the drive circuit 170 is specifically designed and adapted to apply one or more voltage pulses that will cause the deformable elements to deform at their resonant frequency between the first and second operating states illustrated in FIGS. 4–7 when the switch 60 is closed. Various drive circuits well known to those skilled in the design and operation of optical light modulators, such as the system disclosed in U.S. Pat. No. 6,038,057 to Brazas et al.

Figure 9:
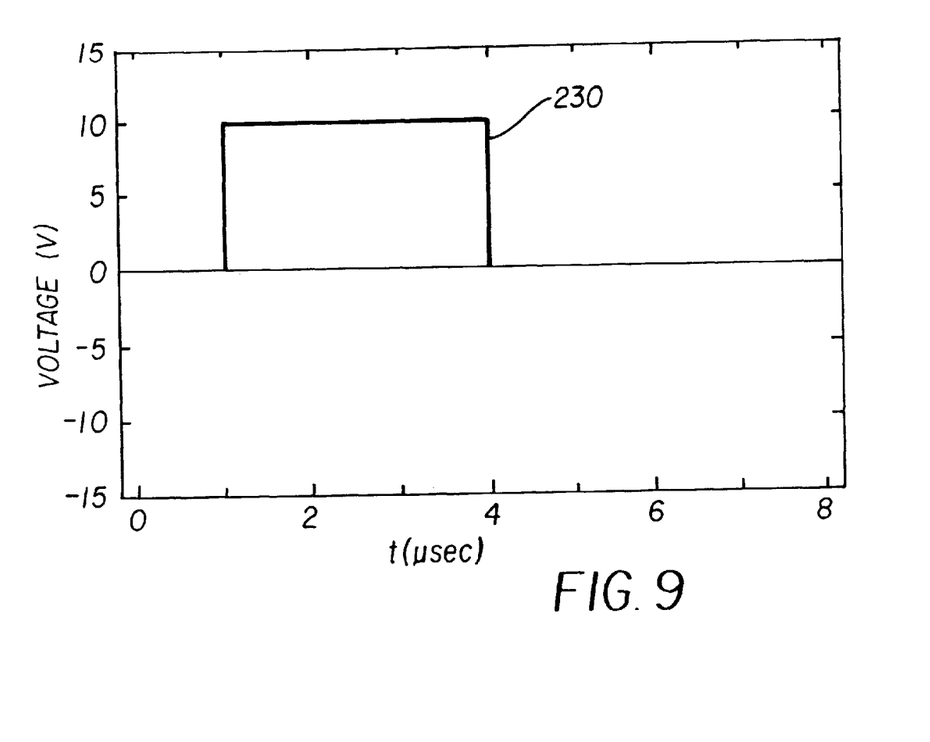
FIG. 9 is a plot of an input voltage pulse for determining the resonant frequency of the light modulator.

FIG. 9 shows an input voltage pulse 230 applied by the drive circuitry 170 of FIG. 8 across the conductive layer 30 on the deformable elements 12 and the conductive layer 26 on the base 20 for determining strain of structural member 110 (shown in FIG. 3). The input voltage pulse 230 is used to determine the resonant frequency of the deformable elements 12 (see FIG. 8).

Figure 10:
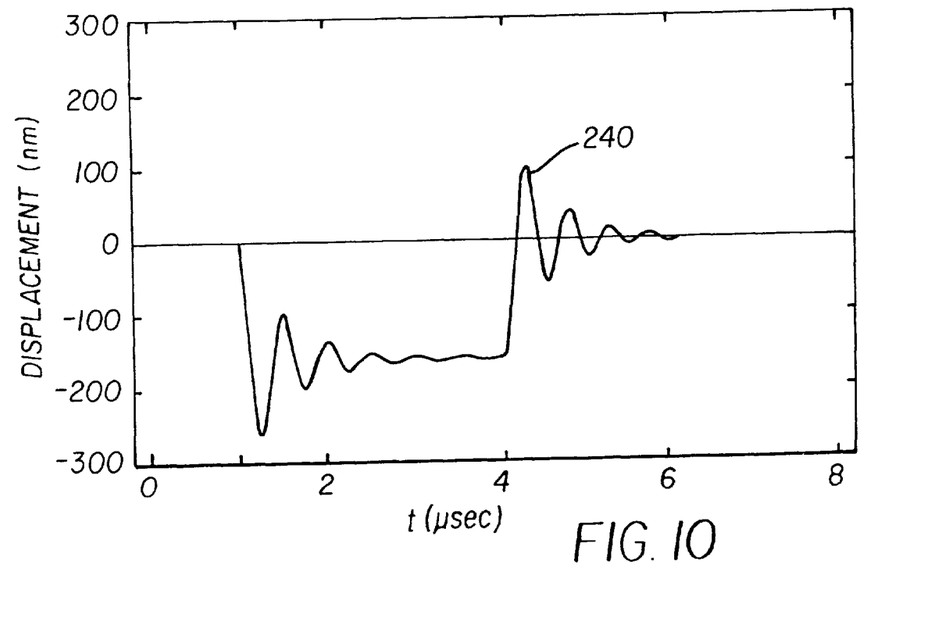
FIG. 10 is a plot of the displacement of the center point of a deformable element in response to the input voltage of FIG. 9.

FIG. 10 shows the response of the deformable elements 12 of FIG. 8 to the input voltage pulse 230 of FIG. 9. Specifically, it shows the displacement profile 240 of the center of the deformable elements 12 of FIG. 8.

Figure 11:
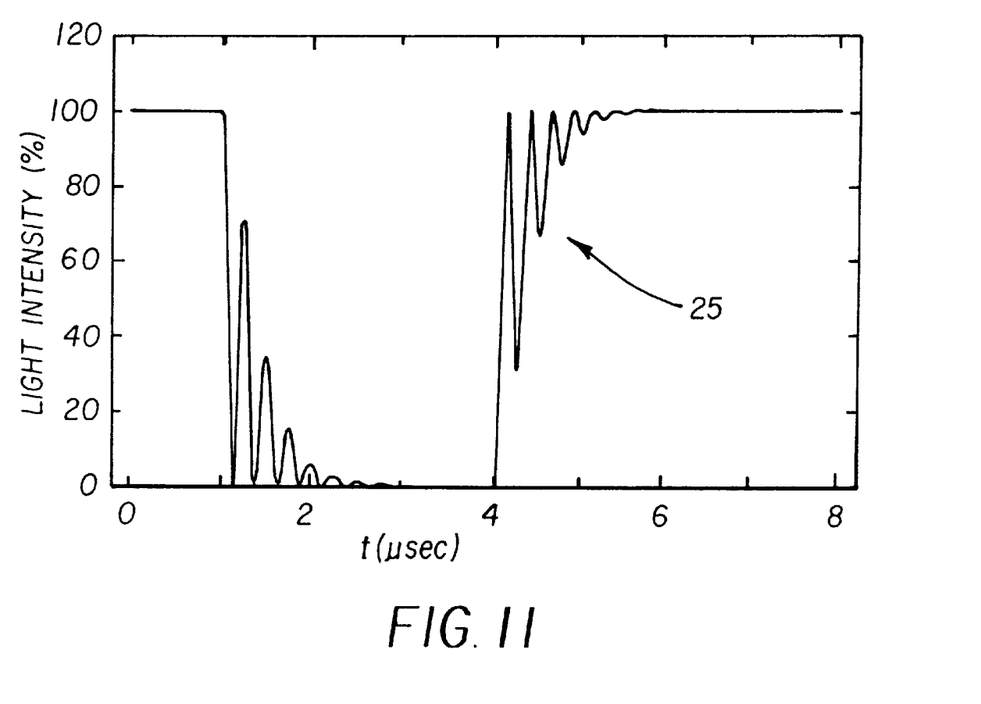
FIG. 11 is a plot of the modulated light intensity produced by the light modulator in response to the input voltage of FIG. 9.

FIG. 11 shows a profile of the modulated light intensity 250 that is generated by the deformable elements 12 of FIG. 8 in response to the input voltage pulse 230 which is applied by drive circuitry 170 shown in FIG. 8. The profile of the modulated light intensity 250 is produced by output device 220 as described in the description of FIG. 1 above.

Referring to FIGS. 9, 10 and 11, the behavior of the light modulator 100 shown in FIG. 8 for use as a optical strain gauge is as follows: The resonant frequency $f_{res}$ of the deformable elements 12 under high tensile stress is given by $$f_{res} = \frac{1}{2\pi L}\left(10\frac{\sigma}{\rho}\right)^{1/2}$$

where σ, ρ and L are the residual tensile stress, density and length of the deformable elements 12 of FIG. 8. If the deformable elements 12 of FIG. 8 are subjected to a strain ΔL/L, the resonant frequency changes according to the following formula, $$f_{res} = \frac{1}{2\pi L}\left(10\frac{\sigma + \Delta\sigma}{\rho}\right)^{1/2}$$

where $$\Delta\sigma = E\frac{\Delta L}{L}$$

and E is Young's modulus of the of the deformable elements 12. When ΔL<<L, which is the case for optical strain gauge applications, the resonant frequency can be approximated by $$f_{res} \approx f_{res}^0\left(1 + \frac{1}{2}\frac{\Delta\sigma}{\sigma}\right),$$

$$f_{res} \approx f_{res}^0\left(1 + \frac{1}{2}\frac{E}{\sigma}\frac{\Delta L}{L}\right).$$

where $f^0_{res}$ is the resonant frequency of the deformable elements 12 when there is no strain. If the deformable elements 12 are compressed ΔL<0, the resonant frequency is reduced. If the deformable elements 12 are stretched ΔL>0, the resonant frequency increases.

It is instructive to compute the resonant frequency of deformable elements 12 made from silicon nitride with the following parameters E=210 Gpa, ρ=3100 Kg/m³, ρ=1100 Mpa, and L=20 microns. The resonant frequency is $f_{res}$= 14.32 MHz. If the deformable elements 12 are stretched by 5 nanometers, they experience a strain of 0.00025, and the resonant frequency increases by approximately 683 kHz. This frequency shift can be detected, and therefore, the optical strain gauge can be used to detect elongation's or contractions on the order of nanometers.

If the resonant frequency of the deformable elements 12 shown in FIG. 8 is measured, the strain can be estimated using $$\frac{\Delta L}{L} \approx 2\frac{\sigma}{E}\left(\frac{f_{res}}{f_{res}^0} - 1\right) \qquad (1)$$

The resonant frequency of the deformable elements 12 of FIG. 8 can be determined as follows: first, referring to FIG. 8, drive circuitry 170 applies an input voltage pulse 230 as shown in FIG. 9 across the conductive layer 30 on the deformable elements 12 and the conductive layer 26 on the base 20. This causes the center of the deformable elements 12 to be displaced as shown in FIG. 10. The movement of the deformable elements 12 gives rise to a diffraction pattern as described above.

Referring to FIGS. 1 and 11, the strain induced modulated light 130 is directed by the optical system 150 to the sensor. The sensor 160 provides a sensor signal 190 to output circuitry 200. Output circuitry 200 converts the sensor signal 190 to an output data signal 210 which is stored and/or displayed by output device 220. A sample profile of modulated light intensity 250 as stored/displayed by the output device 220 is shown in FIG. 11. In this case, the profile of modulated light intensity 250 represents the light reflected from the light modulator i.e., the m=0 diffracted mode. The profile of modulated light intensity 250 is of the form $$I(t)=I_0[1-Ae^{-\gamma t}\cos^2(\beta f_{res}t+\delta)].$$

where t=0 corresponds to the trailing edge of the input voltage pulse 230, $I_0$ is the intensity of the incident light 120, and γ and β are device dependent parameters. The profile of modulated light intensity 250 can be curved to determine the resonant frequency $f_{res}$ of an elongated ribbon element 23a, as is well known. Once $f_{res}$ is known, Equation (1) can be used to determine the strain.

It is instructive to note that the oscillation of the deformable elements 12 is damped out due to the squeeze film damping effects of the ambient gas in the gap beneath elongated ribbon element 23a as described by Furlani, in "Theory and Simulation of Viscous Damped Reflection Phase Gratings," J. Phys. D: Appl. Phys, 32 (4), 1999, and by T. Veijola, H. Kuisma and T. Ryhanen in "Equivalent-circuit model of squeezed gas film in a silicon accelerometer," Sensors and Actuators A 48, 1995.

As those skilled in this art will readily appreciate from the foregoing description and the accompanying drawings, the strain gauge of this invention can sense strain optically at locations that are remote from the strained structural member. Moreover, the strain gauge of this invention can be used to measure structural changes in length, on the order of nanometers. Of course, those skilled in the art will also appreciate that many modifications may be made to the embodiments disclosed herein within the scope of this invention, which is defined by the following claims.

PARTS LIST

12 deformable element
14 frame
16 spacer layer
20 base
22 substrate
24 passivating layer
26 conducting layer
30 conductive reflective layer
40 light wave
42 arrows
50 power source
60 switch
100 light modulator
110 structural member
120 incident light
130 modulated light
140 light source
150 optical system
160 sensor
170 drive circuitry
180 circuit
190 sensor signal
200 output circuitry
210 output data signal
220 output device
230 input voltage pulse
240 displacement profile
250 profile of modulated light intensity

What is claimed is:

1. A method for measuring strain in a structural member comprising:

(a) mounting a light modulator comprising deformable elements having reflective surfaces and a resonant frequency that varies as a function of strain on the deformable elements on the structural member;

(b) applying a force to the deformable elements to cause them to deform at their resonant frequency between first and second operating states;

(c) directing incident light onto the light modulator and directing modulated light from the modulator to a sensor that produces an output signal that varies as a function of the frequency of the modulated light; and (d) generating a representation of the strain in the structural member from the output signal, wherein the strain in the structural member is determined in accordance with the following relationship:

$$\frac{\Delta L}{L} \approx 2\frac{\sigma}{E}\left(\frac{f_{res}}{f^0_{res}} - 1\right)$$

wherein $\sigma$ and $E$ are a residual tensile stress and Young's modulus of the deformable elements, $f_{res}$ and $f^0_{res}$ are the resonant frequencies of the deformable elements with and without strain, respectively, and $\Delta L/L$ is the strain of the deformable elements.

2. A method in accordance with claim 1, further comprising extracting a frequency dependent signal from the output signal produced by the sensor and generating the representation of the strain in the structural member from the frequency dependent signal.

* * * * *